US006675286B1

(12) United States Patent
Sun et al.

(10) Patent No.: US 6,675,286 B1
(45) Date of Patent: Jan. 6, 2004

(54) MULTIMEDIA INSTRUCTION SET FOR WIDE DATA PATHS

(75) Inventors: Weiyun Sun, Seattle, WA (US); Stefan G. Berg, Seattle, WA (US); Donglok Kim, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/561,406

(22) Filed: Apr. 27, 2000

(51) Int. Cl.[7] ............................................. G06F 9/302
(52) U.S. Cl. ...................... 712/215; 712/222; 708/603
(58) Field of Search ......................... 712/215, 9, 7, 712/20, 22, 23, 24, 32, 42, 209, 210, 222, 218, 229; 345/419; 708/523, 524, 603, 607

(56) References Cited

U.S. PATENT DOCUMENTS

| | | | | |
|---|---|---|---|---|
| 6,044,448 A | * | 3/2000 | Agrawal et al. ................ 712/9 |
| 6,115,812 A | * | 9/2000 | Abdallah et al. ............ 712/300 |
| 6,212,618 B1 | * | 4/2001 | Roussel ............................ 712/7 |
| 6,272,616 B1 | * | 8/2001 | Fernando et al. ............. 712/20 |
| 6,288,723 B1 | * | 9/2001 | Huff et al. ................... 345/644 |
| 6,366,998 B1 | * | 4/2002 | Mohamed .................... 712/17 |
| 6,418,529 B1 | * | 7/2002 | Roussel ....................... 712/221 |
| 6,426,746 B2 | * | 7/2002 | Hsieh et al. ................. 345/419 |

OTHER PUBLICATIONS

Stotland et al., "Image Computing Library for a Next–Generation VLIW Multimedia Procesor," SPIE Vol 3655; Part of IS&T/SPIE Conference on MEdia Processors 1999.
McKee et al.; "Smarter Memory: Improving Bandwidth for Streamed References;" IEEE Computer, Vol 31, No. 7, 1998.
Basoglu et al., High–Performance Image Computing with Modern Microprocessors, International Journal of Imaging Systems and Technology, vol. 9, 1998.
Rathman et al.; "Processing the New World of Interactive Media," IEEE Signal Processing Magazine, Mar. 1998.

* cited by examiner

Primary Examiner—Henry W. H. Tsai
(74) Attorney, Agent, or Firm—Steven P. Koda (57) ABSTRACT

Partitioned sigma instructions are provided in which processor capacity is effectively distributed among multiple sigma operations which are executed concurrently. Special registers are included for aligning data on memory word boundaries to reduce packing overhead in providing long data words for multimedia instructions which implement shifting data sequences over multiple iterations. Extended partitioned arithmetic instructions are provided to improve precision and avoid accumulated carry over errors. Partitioned formatting instructions, including partitioned interleave, partitioned compress, and partitioned interleave and compress pack subwords in an effective order for other partitioned operations.

12 Claims, 7 Drawing Sheets

TYPE 2

FIG.10

TYPE 3

FIG.11

TYPE 4

FIG.12

TYPE 5

MULTIMEDIA INSTRUCTION SET FOR WIDE DATA PATHS

BACKGROUND OF THE INVENTION

This invention relates to microprocessor instruction sets, and more particularly to a multimedia instruction set for handing multiple data operands on a mediaprocessor.

A microprocessor executes programmed instructions to perform desired functions. Typically for a given microprocessor model there is a given instruction set. An instruction set is a set of machine instructions that a microprocessor recognizes and can execute. Each instruction in the set is identified by a digital instruction code, operands for specifying an address, special bits used for indexing or another purpose, and occasionally a data item itself.

To meet the demanding computing needs of digital video processing and other multimedia applications, various levels of parallelism in microprocessors have developed. Because imaging algorithms are easily adapted to parallel processing structures, parallel architectural features are becoming available at a reduced cost. Previously, applications requiring high computational performance have been implemented on multiprocessor systems. In such systems a task is broken up into pieces, and the multiple pieces are executed in parallel by multiple processors. Such multiprocessor systems have not gained widespread commercial acceptance because of their high costs. Also, the improved performance of inexpensive general purpose microprocessors and the more recent digital signal processors have provided a less expensive platform for more complex processing tasks. Many new microprocessors and digital signal processors are employing on-chip parallelism, mainly by a technique referred to as instruction level parallelism. Such processors as adapted for multimedia processing (e.g., video processing) are referred to herein as mediaprocessors.

Instruction-level parallelism is where multiple operations are initiated in a single clock cycle. Two approaches to instruction-level parallelism are: the very long instruction word (VLIW) architecture and the superscalar architecture. In a VLIW architecture processor there are many independent functional units. Each long instruction contains an operation code for each functional unit. All functional units receive their operation code at substantially the same time. The functional units execute their assigned tasks concurrently. Superscalar architectures use special on-chip hardware to look through the instruction stream and find independent operations that can be executed at the same time to maximize parallelism.

Instruction-level parallelism is further extended in some systems using subword parallelism, in which an execution unit is partitioned into multiple smaller units. For example, processes implemented by a 64-bit arithmetic logic unit (ALU) in essence split the ALU logically into four smaller 16-bit ALU's. Specifically the data input to the ALU is a concatenation of four smaller subwords. The ALU output is a concatenation of the results on the four subwords. Such subword parallelism is incorporated into an architecture by providing what are referred to as "single instruction multiple data" (SIMD) instructions. Examples of such an implementation are: Sun Microsystem's visual instruction set, Intel's multimedia extension, Hewlett-Packard's multimedia acceleration extensions, Digital Equipment Corporation's multimedia extensions, and Silicon Graphics, Inc.'s MIPS digital media extension. Instructions among these extensions treat a data word (e.g., 32 bit or 64 bit) as a set of multiple subwords (8, 16 or 32). Partitioned operations may be executed on each subword, obtaining 2-times, 4-times or 8-times performance improvement with minimal added hardware. Even with these new architectures, however, carefully developed algorithms are needed to achieve a significant performance improvement.

Current SIMD instructions are categorized into the following groups: (i) partitioned arithmeticaogic instructions; (ii) sigma ($\Sigma$) instructions; (iii) partitioned select instructions; and (iv) formatting instructions. Partitioned arithmetic/logic instructions include partitioned add, partitioned subtract, partitioned multiply, partitioned compare, partitioned shift, and similar type instructions. For example, in a partitioned addition instruction a data word is partitioned into subwords and each subword is used for respective addition operations. Sigma instructions include inner product, sum of absolute difference, sum of absolute value and similar instructions. These instructions are characterized by the "sum of" a set of operations. The sum of operation is referred to in mathematics with the greek symbol sigma, ($\Sigma$). Partitioned select instructions include partitioned min/max, partitioned conditional selection, and similar instructions. Formatting instructions include map, interleave, compress, expand, and similar instructions.

Partitioned arithmetic/logic instructions, sigma instructions, and partitioned select instructions speed up processing by performing multiple operations concurrently in one direction. Formatting instructions are used mainly for rearranging data to allow parallel-type processing of the data (e.g., in a pipeline). Most SIMD instructions have been developed on 32-bit or 64-bit architectures. Such bit size limits the maximum number of concurrent operations that can be performed. Widening the data path would seem to be one way of increasing the data-level concurrence. However, while the partitioned arithmetic/logic instructions and the partitioned select instructions can be readily extended to a wider architecture, the sigma instructions and some formatting instructions would require more complicated hardware and result in additional pipeline stages when extended for a machine with a wider architecture (than the conventional 32-bit and 64-bit architectures). This is because the sigma and formatting instructions involve operations across multiple data partitions within a word. The hardware complexity for such operations would increase more than linearly as the data path width increases. Accordingly, there is a need for more flexible SIMD instructions which are effective at handling multimedia data for processors having wider architectures.

Another shortcoming of current multimedia instruction offerings is that, typically, the arithmetic precision is not well handled. Specifically, in partitioned add/subtract/multiply instructions, the destination operand word is given the same number of bits as the source operand words. Consequently, the overflow must be handled by scaling down the results, which inevitably introduces some truncation error. This is particularly undesirable, because when these partitioned arithmetic instructions are cascaded, the truncation error accumulates, sometimes leading to an unacceptably large error. Accordingly, there is a need for more effective partitioned arithmetic multimedia instructions.

SUMMARY OF THE INVENTION

According to the invention, a set of multimedia instructions is implemented which overcomes the shortcomings of the prior conventional SIMD instruction sets.

According to one aspect of the invention, conventional sigma instructions are supplemented with partitioned sigma instructions. Conventional sigma instructions include: inner product; sum of absolute differences, sum of absolute values, and sum of subwords. Additional instructions are provided, including a partitioned inner product instruction, a partitioned sum of absolute differences instruction, a partitioned sum of absolute values instruction. Similar partitioned sigma instructions may be provided corresponding to other sigma instructions. One advantage of partitioning the sigma instructions is that multiple sigma instructions are executed concurrently to effectively use the capacity of the mediaprocessor.

According to another aspect of the invention, special registers are included for aligning data on memory word boundaries to reduce packing overhead in providing long data words for instructions which implement data sequences which shift during subsequent iterations.

According to another aspect of the invention, precision is improved for partitioned arithmetic instructions. Specifically, 'extended' partitioned arithmetic instructions are provided. An advantage of these instructions is that accumulation of precision errors are avoided. In particular accumulated precision errors are truncated.

According to another aspect of the invention, additional formatting instructions are provided. Such additional instructions are partitioned formatting instructions and include partitioned interleave, partitioned compress, and partitioned interleave and compress. An advantage of these instructions is that subwords are packed in an effective order for performing other partitioned operations.

According to another aspect of the invention, mixed precision source operands are supported for the partitioned sigma instructions, extended partitioned arithmetic instructions and partitioned formatting instructions.

These and other aspects and advantages of the invention will be better understood by reference to the following detailed description taken in conjunction with the accompanying drawings.

DESCRIPTION OF SPECIFIC EMBODIMENTS

Overview

Figure 1:
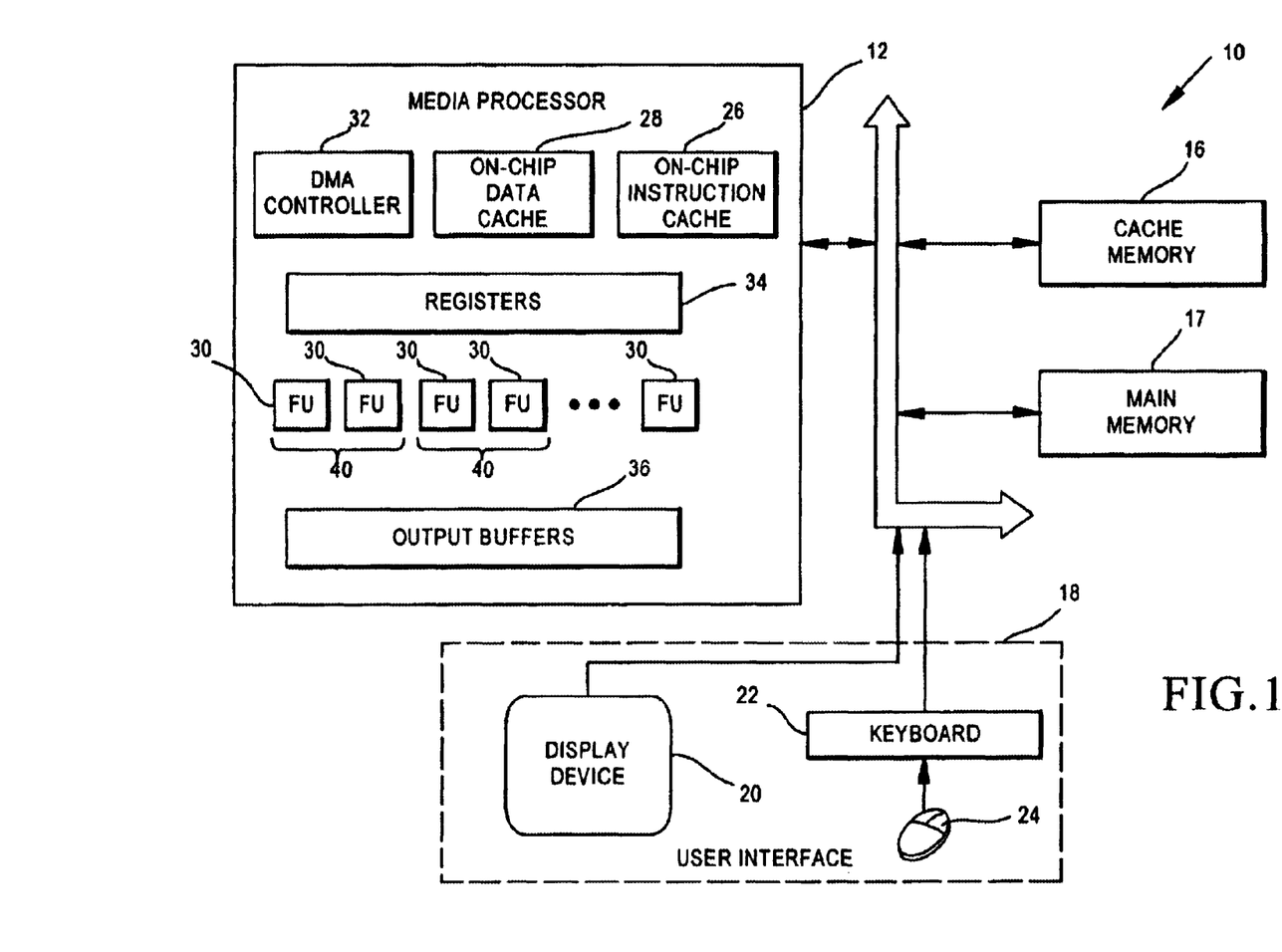
FIG. 1 is a block diagram of a system having a mediaprocessor for implementing the multimedia instruction embodiments of this invention.

FIG. 1 shows a block diagram of a system 10 having a partitioned operation architecture adapted for hosting the multimedia instructions of this invention. The system 10 includes a mediaprocessor 12, main memory 14, cache memory 16 and a user interface 18. The user interface 18 includes a display device 20, a keyboard 22 and a pointing/clicking device 24. The media processor 12 includes at least one functional unit (i.e., processing unit) 30, on-chip instruction cache 26, on-chip data cache 28, a DMA controller 32, registers 34 and output buffers 36. For an embodiment in which the system 10 has a superscalar architecture, a single functional unit executes the multimedia instruction in a single instruction multiple data (SIMD) operand format. In a very long instruction word ('VLIW') architecture, each functional unit may execute a multimedia instruction of this invention. In particular, the subinstruction of a VLIW processor is processed as a single instruction multiple data operand sub-instruction. Thus, a VLIW subinstruction corresponds to a multimedia instruction of this invention.

Figure 2:
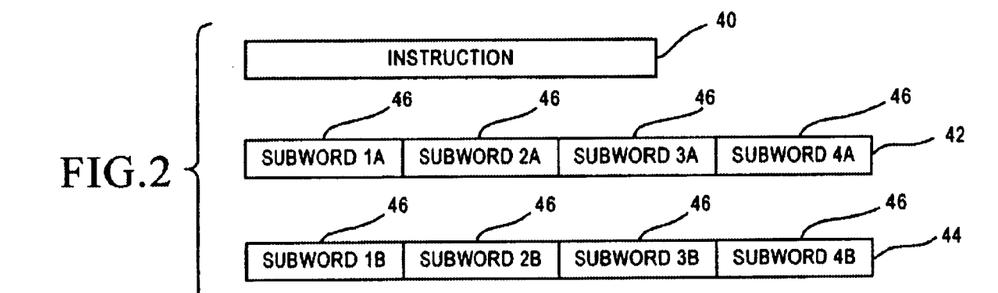
FIG. 2 is a diagram of a multimedia instruction for a partitioned operation.
Figure 3:
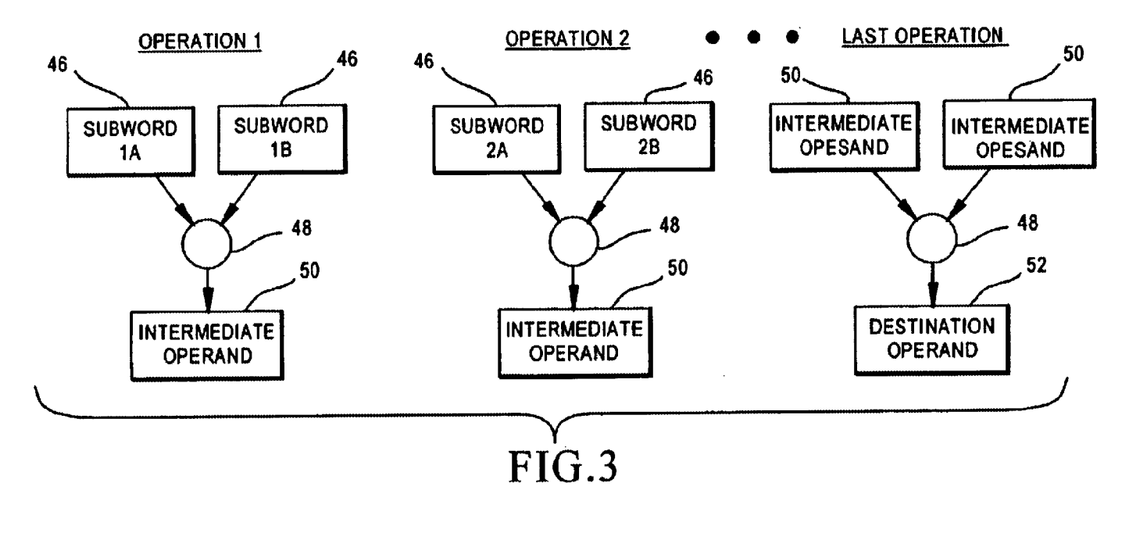
FIG. 3 is a diagram of a set of operations performed for a partitioned instruction.

Referring to FIGS. 2 and 3 the multimedia instruction 40 is a partitioned operation instruction. A given functional unit 30 receives the instruction 40 and one or more source operands 42, 44. The instruction is executed as a set of operations 48. The source operands are partitioned into multiple subwords 46. A subword 46 is an input operand for an operation of the sequence of operations. Execution of a given operation results in an intermediate operand 50. Execution of the last operation results in a destination operand 52—the final result of the multimedia instruction 40. Of particular note is that the two source operands may be of a different precision for select multimedia instructions of this invention.

Partitioned Sigma Instructions

The conventional sigma instructions referred to in the background section include an inner product instruction, sum of absolute difference instruction and sum of absolute values instruction. In general they are sigma ($\Sigma$) summations of another operation (e.g., product, absolute difference, absolute value). For example, in an inner product instruction, the i-th subword from each of two source operands (having the same number of subwords) are multiplied together for i=1, n where n is the number of subwords. The respective products then are summed in a sequence of summation until a total sum of all the products is achieved.

New sigma instructions are presented herein. Specifically, these additional instructions are 'partitioned' sigma instructions. Included are a partitioned inner product instruction, a partitioned sum of absolute differences instruction, and a partitioned sum of absolute values instruction. Although specific examples of sigma operations are given, other sigma operations also may be implemented as partitioned sigma instructions.

Following is a detailed description of the partitioned inner product instruction. The conventional inner product instruction and the partitioned inner product instruction derive an inner product which is a summation of products between (i) an input data sequence (i.e., one source operand) and (ii) a coefficient sequence (i.e., another source operand). The mathematical equation is:

$$y = \sum_{i=0}^{n-1} x[i] * k[i]$$

where, x[ ] is the input data sequence;
k[ ] is the coefficient sequence;
y[ ] is the output sequence; and
n is the number of the coefficients (i.e., the FIR tap size).

Figure 4:
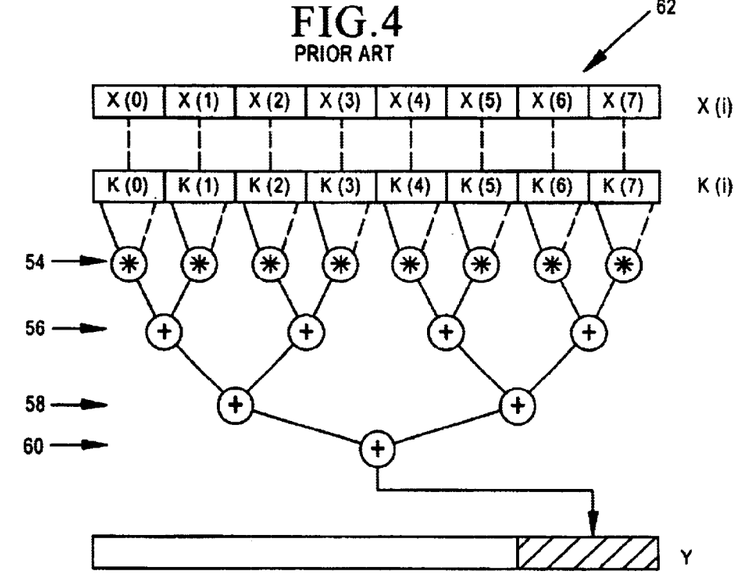
FIG. 4 is a shorthand depiction of the processing stages for an 8-way inner product derived using a conventional inner product instruction.

Inner-products are useful for implementing a finite impulse response (FIR) function or a two-dimensional convolution function, both of which are fundamental algorithms for signal processing and image processing. To derive an inner product with the conventional inner product instruction, subwords are partitioned from the source operands. Referring to FIG. 4, an 8-way inner product is derived using the conventional inner product instruction. There are two source operand words, each being partitioned: x[i] and k[i], where i=0, 1, . . . 7. The result, y, occupies the rightmost portion of the destination operand. At a first level of processing 54, the functional unit 30 performs eight multiplication operations of a subword from the input data sequence source operand x(i) and a subword from the coefficient sequence source operand k(i). Eight products (P0, P1, . . . , P7) are derived, being stored as intermediate operands. At a second level of processing 56, intermediate operands from the first level of processing serve as inputs. The functional unit 30 performs a set of addition operations, in which the previously derived products (i.e., the intermediate operands from the level one processing operations) are summed in groups of two. Four additions are performed, resulting in four sums, (Q1, Q2, Q3, Q4). At the third level 58, the two sums are added, resulting in two sums, (Q5, Q6). At the fourth level 60, the two sums are added, resulting in a total sum of all the products, (i.e., an inner product). The total sum of the products is stored in the destination operand for the instruction. Note that the final result, the inner product Q7 uses only a portion of the destination operand of the functional unit 30.

Notice that for a conventional inner-product instruction, the number of processing operations increases as the number of subwords increases (i.e., the number of entries i). In the example described, there are 8 subwords. Accordingly, there are 8 multiplications and 7 additions. The term, n-way inner product, is used herein to denote an inner-product that performs 'n' multiplications and 'n−1' additions.

To implement an FIR function or a two-dimensional convolution one or more inner-product instruction are needed to generate one output. Although the conventional inner-product operation enhances computational capability, it has several limitations, including:

(i) A functional unit has a fixed number of operational partitions. Each partition corresponds to a subword of an operand. When the number of coefficients of an operand needed to derive an inner product is small, and the number of partitions is large, the computational resources are not well utilized. For example, when an 8-way inner product instruction is used to compute a 3-tap finite impulse response function, only three out of eight partitioned slots are utilized.

(ii) Each functional unit uses a wide input data port and a wide output data port. Because the inner-product instruction generates one output, only one portion of the wide output field is used. Thus, only part of the output bandwidth and part of the register field are utilized.

(iii) Because an output uses only a portion of the output field of the functional unit, outputs from multiple inner-product instructions need to be combined, as when performing an FIR or 2D convolution. As a result, extra instructions are executed to pack the separate results into a full register before they are stored into the memory. The wider the inner-product instruction, the more packing overhead that is incurred.

(iv) When the data path becomes wider, the inner-product instruction requires more pipeline stages to perform the necessary accumulation operation. A direct consequence of this is a long instruction latency which complicates the code scheduling task.

A partitioned inner-product instruction is developed to overcome the limitations of the conventional inner product instruction. According to the new 'partitioned' inner product instruction presented here, the partitions of the functional unit and the subwords of operands are further partitioned, or grouped. Each group functions like a short inner-product functional unit, for which we use the term "sub-inner-product functional unit". In the case of a FIR filter, the coefficients are replicated across the subwords of the operand and for all the sub-inner-product functional units. Therefore, the number of zero subwords, relative to the conventional inner product instruction, is reduced. As a result, the computation capacity of a functional unit is better utilized. The results from these sub inner-product functional units form the destination operand.

For a data path which is w-bits wide and where a g-bit sub-inner-product (or other sigma instruction) result is desired, the maximum number of partitions for a given functional unit is 'w/g'. For example, with a 256-bit data path and a 32-bit result, there are up to 8 inner products for a functional unit. Different partitioned inner-product instructions are distinguished by the number of partitioned slots associated with each sub-inner-product functional unit. When a sub-inner-product functional unit contains n partitions, the functional unit can execute an n-way partitioned inner-product instruction. For a data path which is w-bits wide and each partition is 8-bit wide, w/(8*n) sub-inner products can be computed concurrently. Each sub-inner-product result is 32-bit wide (i.e., g=32), n must meet the condition (n≧4 and w≧32). This is because the number of sub-inner-product functional units can not exceed w/32 as explained above. Where a data path is w-bit wide and each partition is 16-bit wide, w/(16*n) sub-inner products can be computed concurrently. When the inner-product result is 32-bit wide, n meets the condition (n≧2 and w≧32).

In most multimedia applications the input data are either 8-bits, such as in image data and video data, or 16-bits, as in audio data. Most of the FIR and two-dimensional convolution coefficients are 16-bits. Accordingly, in a preferred embodiment, (i) an 8-bit×16-bit partitioned inner-product instruction, and (ii) a 16-bit×16-bit partitioned inner product instruction, are implemented. These instructions overcome the shortcomings of a conventional 8-bit×16-bit inner product instruction and a 16-bit by 16-bit inner product instruction, respectively.

With regard to the 8-bit by 16-bit case, in an architecture where the output data path of the mediaprocessor is w bits and the result of a sub-inner product is 32 bits, the output data path can accommodate up to w/32 results. Further, for an L-tap FIR algorithm the average number of partitioned inner product instructions required is:

$$\text{Avg \# Instructions} = \frac{L/n}{\max(W/8n,\ W/32)}$$

where n is the number of partitions within a sub-inner-product.

Table 1 below shows the 'average' number of instructions for each output to compute an 8-bit by 16-bit L-tap FIR filter with partitioned n-way inner-product instructions in a W=256-bit architecture.

TABLE 1

| L<br>n-way | 1–2 | 3–4 | 5–6 | 7–8 | 9–10 | 11–12 | 13–14 | 15–16 | 17–18 | 19–20 |
|---|---|---|---|---|---|---|---|---|---|---|
| 2-way | 1/8 | 2/8 | 3/8 | 4/8 | 5/8 | 6/8 | 7/8 | 8/8 | 9/8 | 10/8 |
| 4-way | 1/8 | 1/8 | 2/8 | 2/8 | 3/8 | 3/8 | 4/8 | 4/8 | 5/8 | 5/8 |
| 8-way | 1/4 | 1/4 | 1/4 | 1/4 | 2/4 | 2/4 | 2/4 | 2/4 | 3/4 | 3/4 |
| 16-way | 1/2 | 1/2 | 1/2 | 1/2 | 2/2 | 2/2 | 2/2 | 2/2 | 3/2 | 3/2 |

Note that when the tap size, L, is greater than n, the inner-product is decomposed into multiple (L/n) n-tap FIR filters, each of which generates a partial FIR results, which are accumulated. A variant of the partitioned inner product instruction includes an accumulation operation for such cases, wherein one more pipeline stage of processing is performed. For example, where L=7 and n=4 two instructions are executed to perform the FIR algorithm: a partitioned inner-product instruction and a partitioned inner product instruction with accumulation. Because the data path is W=256 bits, eight 4-way 8-bit by 16-bit inner product operations can be accommodated concurrently. Thus, eight 7-tap filters can be computed in parallel. Each 7-tap filter requires 2 instructions, so the average number of instructions to compute a 7-tap filter can be as low as 2/8, (i.e., in a pipeline of image frames to be processed using the 8 parallel 7-tap filters). In general, one partitioned inner product instruction contains W/8n n-way inner-product operations.

Figure 5:
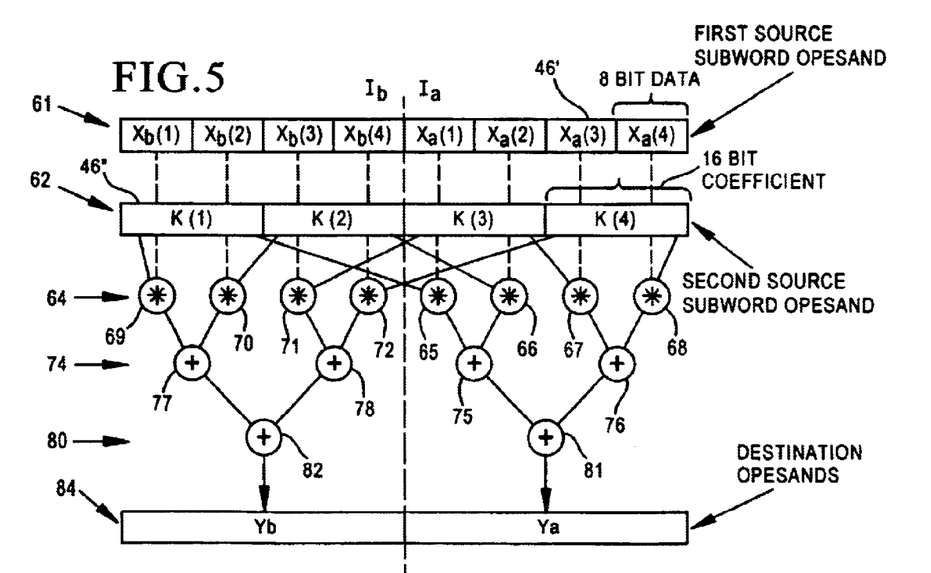
FIG. 5 is a diagram of processing stages for an 8-bit by 8-bit partitioned inner product instruction for a 64-bit data path according to an embodiment of this invention.

Referring to FIG. 5, an execution flow is shown for two 8-bit×16-bit sub-inner-product operations, $I_a$, $I_b$. Each operation implements a 4-way, 4-tap FIR filter. The mediaprocessor 12 has a data path of W=64 bits. The functional unit(s) 30 have 8 partitions. Because n=4, 4 partitions are used for each sub-inner-product operation of the partitioned inner product instruction. The long data word 61 includes the data stream source operand. Because n=4, there are two groups of four data inputs, $x_a(1)$–$x_a(4)$ for operation $I_a$ and four data inputs $x_b(1)$–$x_b(4)$ for operation $I_b$.

The data stream source operands x(i) 46' are 8 bits each. Because there are 4 taps, (L=4), there are 4 coefficients inputs, k(1)–k(4). We are given in this example that the coefficients are 16-bits wide. The same coefficient source operands 46" are input for each operation $I_a$, $I_b$. At a first level 64, four multipliers 65–68 perform four respective multiplications for operation $I_a$, and another four multipliers perform four respective multiplications for operation $I_b$. More specifically, the multipliers execute four multiplication operations, ($x_a(1)$*k(1); $x_a(2)$*k(2); $x_a(3)$*k(3); $x_a(4)$*k(4)), for operation $I_a$. Similarly, another four multipliers 69–72 concurrently perform 4 respective multiplication operations, ($x_b(1)$*k(1); $x_b(2)$*k(2); $x_b(3)$*k(3); $x_b(4)$*k(4)), for operation $I_b$. At a second stage 74, two adders 75, 76 perform two respective additions for operation $I_a$, while another two adders 77, 78 concurrently perform 2 respective additions for operation $I_b$. At a third stage 80, the results of operation $I_a$ additions at adders 75, 76 are processed at an adder 81 to achieve the inner product of $x_a(i)$*k(j) as a final result, $y_a$. Concurrently, at the third stage 80, the results of operation $I_b$ additions at adders 77, 78 are processed at an adder 82 to achieve the inner product of $x_b(i)$*k(j) as a final result, $y_b$. The final results (i.e., subword) destination operands) are 32-bits each and are partitioned subwords of the long word destination operand 84. As illustrated, each sub-sigma operation uses one-half the capacity of the mediaprocessor, (during the first stage). Thus, two 4-way 4-TAP FIR filters are executed in parallel.

For an alternative mediaprocessor architecture in which a 256-bit data path is implemented (rather than the 64-bit data path described for FIG. 6), up to eight 4-way 4-TAP FIR filters are executed in parallel for x(i)=8 bits wide and k(j)=16 bits wide. Thus, the average number of operations for each such FIR filter is 1/8 cycles as shown in Table 1.

Figure 6:
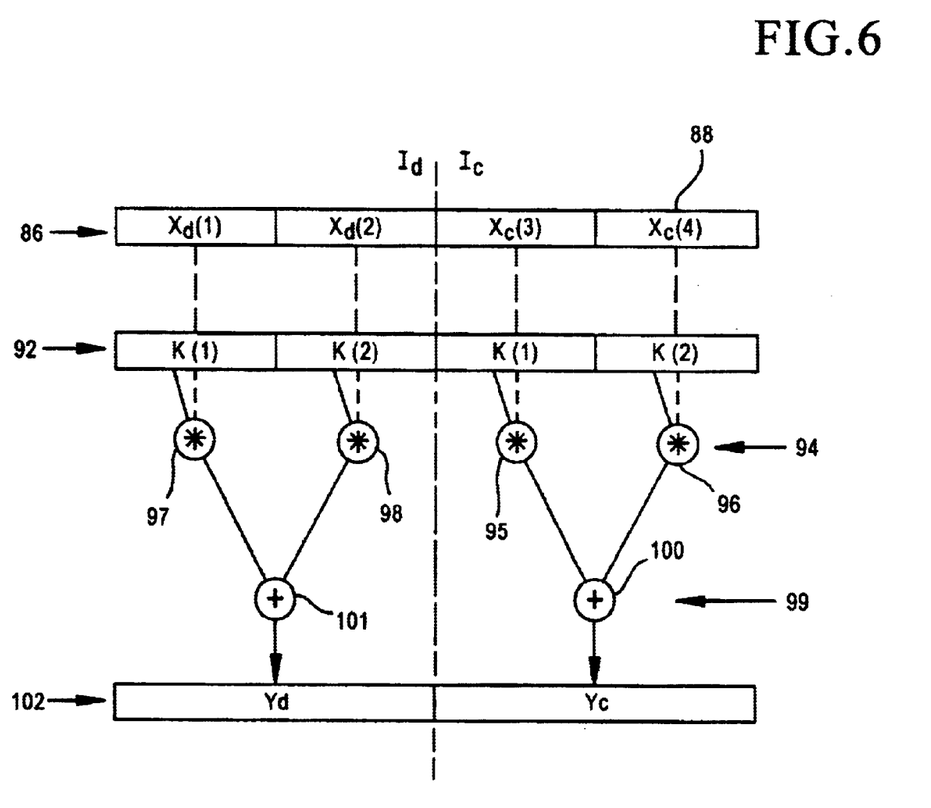
FIG. 6 is a diagram of processing stages for an 8-bit by 16-bit partitioned inner product instruction for a 64-bit data path according to an embodiment of this invention.

As previously mentioned, in most multimedia applications the input data is either 8-bits or 16 bits, while most of the FIR and two-dimensional convolution coefficients are 16-bits. A partitioned inner product sigma instruction for the 8-bit by 16-bit case was discussed above. FIG. 6 shows an execution flow for two 16-bit×16-bit sub-inner-product operations $I_c$, $I_d$, for a mediaprocessor having a 64-bit wide data path.

Each operation $I_c$, $I_d$ implements a 2-way, 2-tap FIR filter. The mediaprocessor has a data path of W=64 bits, and an architecture having 4 partitions. Because n=2, 2 partitions are used for each sub-inner-product operation. The long data word 86 includes the data stream source operands. Because n=2, there are two data inputs, $x_c(1)$–$x_c(2)$ for operation $I_c$ and two data inputs $x_d(1)$–$x_d(2)$ for operation $I_d$. The data stream source operands x(i) 88 are 16 bits each. Because there are 2 taps, (L=2), there are 2 coefficients inputs, k(1)–k(2). At 16 bits apiece, only 32 of the 64 bit data path is used. Thus, in one embodiment, the coefficients are written in two subwords of the long word coefficient source operand 92.

At a first stage 94, two multipliers perform 2 respective multiplications for operation $I_c$, while another two multipliers concurrently perform 2 respective multiplications for operation $I_d$. More specifically, two multipliers 95, 96 execute two multiplication operations ($x_c(1)$*k(1); $x_c(2)$*k (2)), for instruction $I_c$. Similarly, a different two multipliers 97, 98 concurrently perform respective multiplications operations, $(x_d(1)*k(1); x_d(2)*k(2))$, for operation $I_d$. At a second stage 99, one adder 100 performs an addition for operation $I_c$, while another adder 101 concurrently performs an addition for operation $I_d$. The addition at adder 100 yields the inner product of $x_c(i)*k(j)$ as a final result, $y_c$. Concurrently, the adder 101 yields the inner product of $x_d(i)*k(j)$ as a final result, $y_d$. The final results (i.e., subword destination operands) are 32-bits each and are partitioned subwords of the long word destination operand 102. As illustrated, each operation ($I_c$ or $I_d$) uses one-half the capacity of the mediaprocessor, (during the first stage). Thus, two 2-way 2-TAP FIR filters are executed in parallel. Thus, the average number of instructions for each such FIR filter is 1/2 cycles.

For an alternative mediaprocessor architecture in which a 256-bit data path is implemented (rather than the 64-bit data path described for FIG. 6), up to eight 2-way 2-TAP FIR filters are executed in parallel for x(i)=16 bits wide and k(j)=516 bits wide. Thus, the average number of operations for each such FIR filter is 1/8 cycles as shown in Table 2.

Table 2 below shows the average number of instructions for each output to compute a 16-bit by 16-bit L-tap FIR filter with partitioned n-way inner-product instructions in a W=256-bit architecture.

TABLE 2

| L<br>n-way | 1–2 | 3–4 | 5–6 | 7–8 | 9–10 | 11–12 | 13–14 | 15–16 | 17–18 | 19–20 |
|---|---|---|---|---|---|---|---|---|---|---|
| 2-way | 1/8 | 2/8 | 3/8 | 4/8 | 5/8 | 6/8 | 7/8 | 8/8 | 9/8 | 10/8 |
| 4-way | 1/4 | 1/4 | 2/4 | 2/4 | 3/4 | 3/4 | 4/4 | 4/4 | 5/4 | 5/4 |
| 8-way | 1/2 | 1/2 | 1/2 | 1/2 | 2/2 | 2/2 | 2/2 | 2/2 | 3/2 | 3/2 |
| 16-way | 1 | 1 | 1 | 1 | 2 | 2 | 2 | 2 | 3 | 3 |

Note that when the tap size, L, is greater than n, the inner-product is decomposed into multiple (L/n) n-tap FIR filters, each of which generates a partial FIR results, which are accumulated. For example, where L=7 and n=2, four instructions are executed to perform the FIR algorithm: one partitioned inner-product instruction and three partitioned inner product instructions with accumulation. Because the data path is W=256 bits, eight 2-way 16-bit by 16-bit inner product operations can be accommodated concurrently. Thus, eight 7-tap filters can be computed in parallel. Each 7-tap filter requires 4 instructions, so the average number of instructions to compute a 7-tap filter can be as low as 4/8, (i.e., in a pipeline of image frames to be processed using the 8 parallel 7-tap filters).

Figure 7:
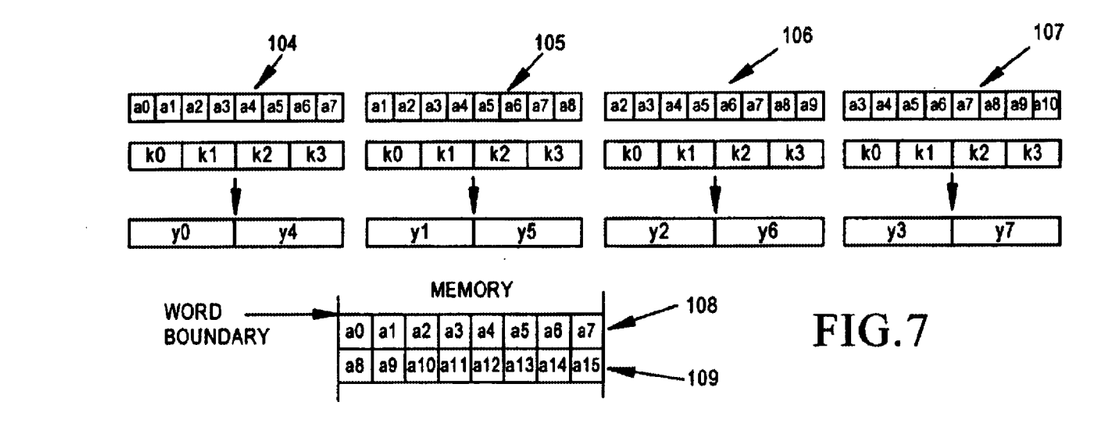
FIG. 7 is a chart of a sequence of four partitioned inner product instructions for implementing a 4-Tap finite impulse responses function according to an embodiment of this invention.

A further enhancement is also provided for the partitioned sigma instructions. Consider again a partitioned inner product instruction used for implementing an FIR function. The FIR computation requires that the input data shift by one element for every output result. For example, while x[0], x[1], . . . , x[n−1] are the data entries for the first FIR result, a new sequence x[1], x[2], . . . , x[n] are the data entries for the second FIR result. Referring to FIG. 7, a sequence of four instructions 104–107 is shown for deriving a 4-tap FIR between an input sequence (a0, a1, . . . , a10) and a coefficient sequence (k0, k1, k2, k3) in a 64-bit architecture. Instruction 104 calculates a FIR result between a0–a7 and k0–k3, where a0–a7 are the data entries for x[0] to x[7]. Instruction 105 calculates an FIR result between a1–a8 and k0–k3, where a1–a8 are the data entries for x[0] to x[7]. Instruction 106 calculates an FIR result between a2–a9 and k0–k3, where a2–a9 are the data entries for x[0] to x[7]. Instruction 107 calculates a FIR result between a3–a10 and k0–k3,where a3–a10 are the data entries for x[0] to x[7]. Referring to FIG. 7, two data words 108, 109 as stored in memory also are shown. The first word 108 include 8 subwords of data, a0 through a7. The second word 109 includes another 8 subwords of data, a8 through a15. Note that the input data sequences required for instructions 105–107 are not aligned at the word boundary.

Figure 8:
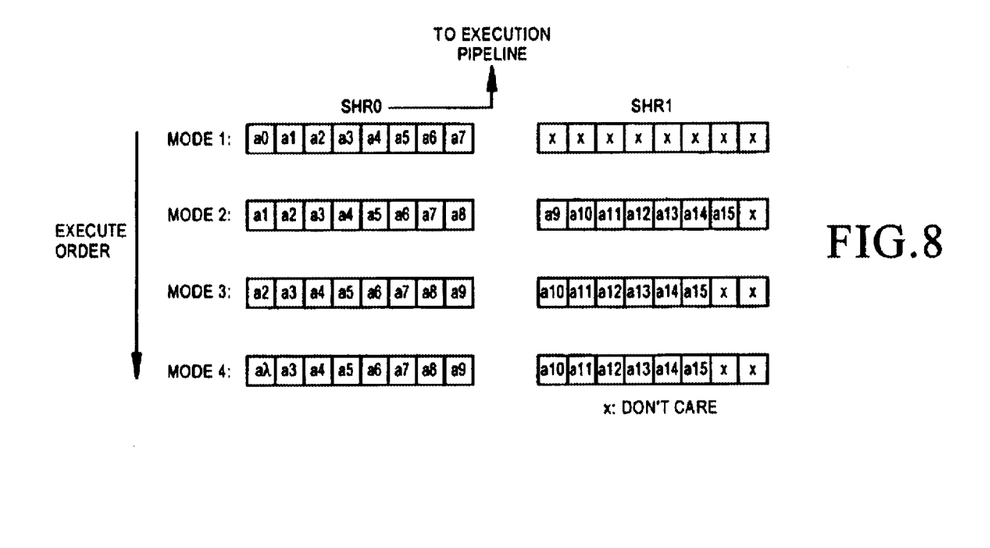
FIG. 8 is a diagram of two registers used with the partitioned inner product instructions of this invention which operate in any of 4 different modes as specified with the instruction operand code, according to an embodiment of this invention.

To ease the processing and avoid additional instructions to pack the data values on a word boundary for instructions 105–107, there are multiple operation modes for the partitioned inner product instructions and the other partitioned sigma instructions. Referring to FIG. 8, data words are read in from memory and loaded into special registers SHR0 and SHR1. These registers are used to perform load and shift operations on the data words to line up the subwords on a word boundary as desired for the various instruction in an FIR or other derivation. In a preferred embodiment the registers SHR0 and SHR1 have the same width as the data path, (i.e., W) and are operated in any of four modes. In a first mode, a data word is loaded from memory into register SHR0. In a second mode, a data word is loaded into register SHR1. Also as part of the second mode, the contents of SHR0 and SHR1 are shifted by one subword length in a common direction. A first subword in SHR0 is shifted out of SHR0, while a first subword in SHR1 is shifted from SHR1 to SHR0. In a third mode, the contents of SHR0 and SHR1 are shifted by one subword length in the same common direction. The first subword in SHR0 is shifted out, while a first subword in SHR1 is shifted from SHR1 to SHR0. In a fourth mode, no action is taken at the registers SHR0 and SHR1. In every mode the contents of register SHR0 is a source operand for partitioned inner product instruction. Specifically, the SHR0 contents correspond to the data sequence x0, x1, . . . , x7. The size of the subword is determined by the instruction operand code. As a computer program engineer writes source code, when writing a given partitioned inner product instruction, a select register mode also is specified.

Extended Partitioned Arithmetic Instructions

Figure 9:
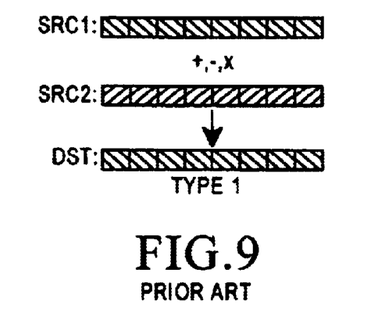
FIG. 9 is a diagram illustrating a conventional arithmetic operation on a VLIW processor where errors accumulate from multiple stages.

Referring to FIG. 9, in a conventional partitioned arithmetic instruction all operands have the same precision. This enables maximum data-level parallelism. However, a shortcoming is that the basic mathematical operations, (i.e., add, subtract, and multiply) can overflow. Saturation and truncation schemes are known methods of avoiding the overflow, but such schemes are prone to introducing errors into the results. In particular, when the results flow through several stages of such partitioned operation, the error accumulates and can lead to an erroneous output. These conventional instructions are useful for simple image processing algorithms which use a single stage of calculation to generate an output. For more complex processes an improved solution is needed.

Figure 10:
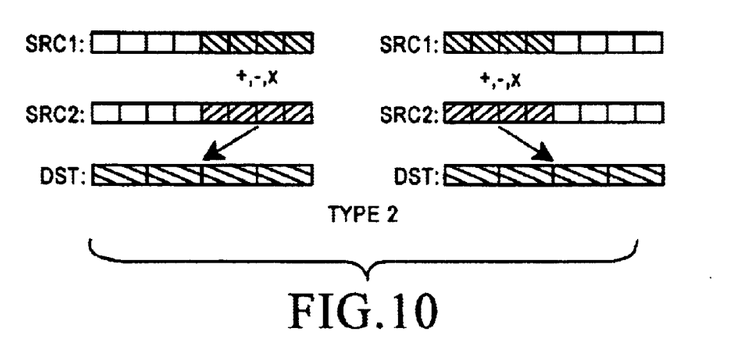
FIG. 10 is a diagram of one type of a partitioned extended arithmetic operation according to an embodiment of this invention.

Four types of extended partitioned arithmetic instructions are introduced to provide added precision. In a preferred mediaprocessor embodiment these additional instructions serve as a complement to the conventional single precision partitioned arithmetic instructions. The conventional partitioned arithmetic instructions are referred to as Type 1 instructions. Referring to FIG. 10, one type of extended partitioned arithmetic instruction, referred to as Type 2 instructions, include two source operands of the same precision and a destination operand having twice the precision of the source operands. Note that only half of the allowable number of source operands (and thus half of the functional units of the mediaprocessor) are used. Because the output is kept in full precision, no overflow or truncation error occurs.

Figure 11:
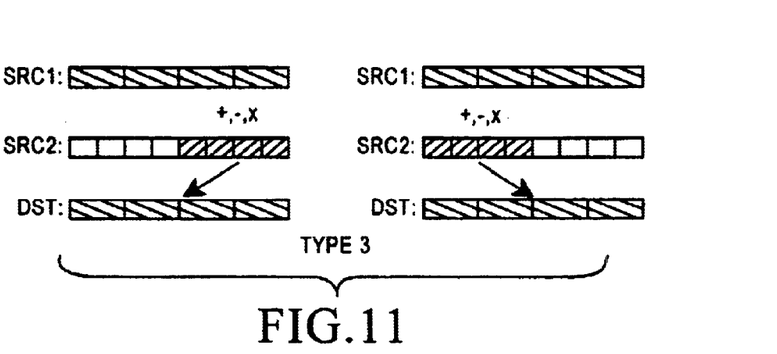
FIG. 11 is a diagram of another type of a partitioned extended arithmetic operation according to an embodiment of this invention.

Referring to FIG. 11, another type of extended partitioned arithmetic instruction (e.g., Type 3) includes one source operand at the same precision as the destination operand, while the other source operand is at half the precision of the other source operand and the destination operand. Overflow is avoided by truncation and saturation schemes. When the results of this type of instruction are accumulated, the truncation error also is accumulated. However, if the ultimate result is to have the same nonextended precision as the one source operand (having half the precision of the other source operand and the destination operand), then the truncation error will be truncated and a more accurate output is achieved. In particular, by truncating the bits in the lower half of each destination operand partition, the accumulated error will also be truncated through this precision conversion. This type of instruction is beneficial, for example, when implementing a vertical image FIR algorithm. (i.e., an L-tap FIR is applied to each column of an 8-bit image.) Note that because the input data of the FIR comes from different rows of the image, a partitioned inner product instruction is not used. This instruction offers an alternative approach to improve an FIR computation. Using a extended partitioned multiply instruction of this type, a row of the output image is computed by multiplying L 16-bit coefficients with n rows of the input image and accumulating the results through partitioned multiply and accumulation instructions. The 16-bit results are then converted into 8 bits by partitioned formatting instructions (introduced in a later section).

Figure 12:
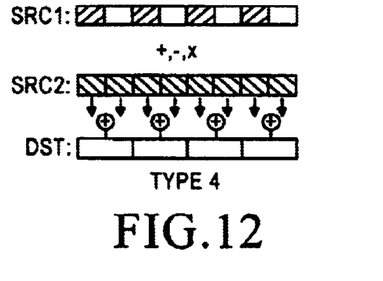
FIG. 12 is a diagram of yet another type of a partitioned extended arithmetic operation according to an embodiment of this invention.

The Type 2 and Type 3 instructions do not fully utilize the computational resources because of the varying precision of the data operands. Referring to FIG. 12 a type 4 extended partitioned arithmetic instruction fully utilizes the computational resources. This is achieved by interleaving the data and including an extra level of accumulation. Various process can be performed with a single instruction, including multiply and accumulate (A*C+B*D); add and accumulate (A+C+B+D); and subtract and accumulate (A−C+B−D). A, B, C and D are source operands. Rather than loading in all of A, B, C or D, the data is interleaved. Consider A as an instruction data source operand including many subwords, A=(a0, a1, . . . ,a7). Similarly, B=b0, b1, . . . ,b7;; C=c0, c1, . . . , c7; and D=d0, d1, . . . , d7. The full operation A (*,+ or −) C plus B (*, + or −) D is carried out in two stages—one for the lower halves i0, i1, i2, i3 and another for the upper halves, i4, i5, i6, i7. Thus, for a first stage the two source operands are: (a0, b0, a1, b1, a2, b2, a3, b3) and (c0, d0, c1, d1, c2, d2, c3, d3) one of the partitions, a0 and c0 are combined (*, + or −). In another partition b0 and d0 are similarly combined. Furthermore, the combinations are accumulated for a0c0 and b0d0. For a multiply with accumulate the result of processing the source operands, (a0, b0, a1, b1, a2, b2, a3, b3) and (c0, d0, c1 , d1, c2, d2, c3, d3), is the destination operand (a0*c0+b0*d0, a1*c1+b1*d1, a2*c2+b2*d2, a3*c3+b3*d3). This is the lower half of the computation (A*C+B*D). At another stage of processing the upper half is derived in which the same functional units now compute (a4*c4+b4*d4, a5*c5+b5*d5, a6*c6+b6*d6, two type 4 instructions are executed implement (A*C+B*D). Using the conventional instructions to derive A*C+B*D would require three instructions and not achieve the precision offered by the type 4 extended partitioned instructions. Compared to the type 2 or 3 instructions, the type 4 instructions provide twice the computing power.

Figure 13:
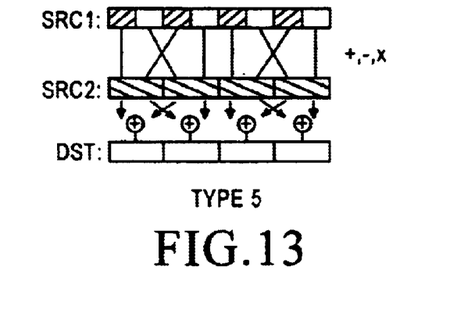
FIG. 13 is a diagram of still another type of a partitioned extended arithmetic operation according to an embodiment of this invention.

Referring to FIG. 13, the other extended partitioned arithmetic instruction, a type 5 instruction, is similar to the type 4 instruction. The type 5 instruction, however, accepts source operands of differing precision, while the type 4 instruction accepts source operands of the same precision. Consider the operation A*c+B*d. A and B are input vectors (a0, a1, . . . , a7) and (b0, b1, . . . , b7), respectively. Each value ai is 8 bits. Each value bi is also 8 bits. The coefficient c is a 16-bit value. The coefficient d is a 16-bit value. Interleaving A and B gives two 64-bit operands (a0, b0, a1, b1, a2, b2, a3, b3) and (a4, b4, a5, b5, a6, b6, a7, b7). Interleaving c and d gives two 64-bit operands, (c,d,c,d) and (c,d,c,d). At one stage of processing one source operand is (a0, b0, a1, b1, a2, b2, a3, b3), while the other source operand is (c,d,c,d). The resulting destination operand is (a0*c+b0*d, a1*c+b1*d, a2*c+b2*d, a3*c+b3*d), the lower half of the computation (A*c+B*d). The upper half is computed in a second stage. Thus, two type 5 instructions are executed to implement A*c+B*d.

Partitioned Formatting Instructions

Figure 14:
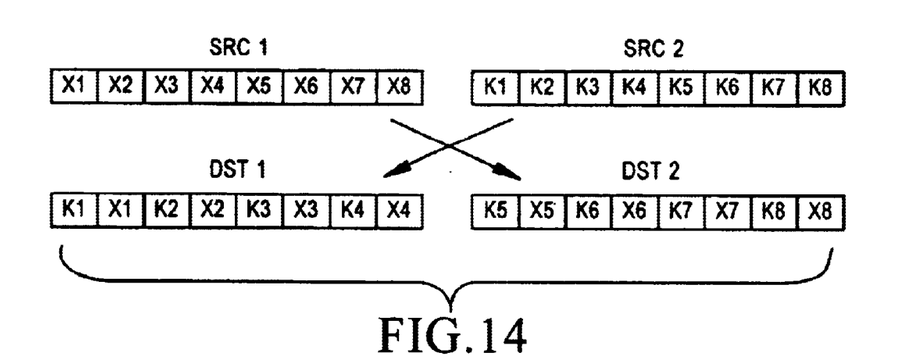
FIG. 14 is a diagram of a partitioned interleave operation according to an embodiment of this invention.
Figure 15:
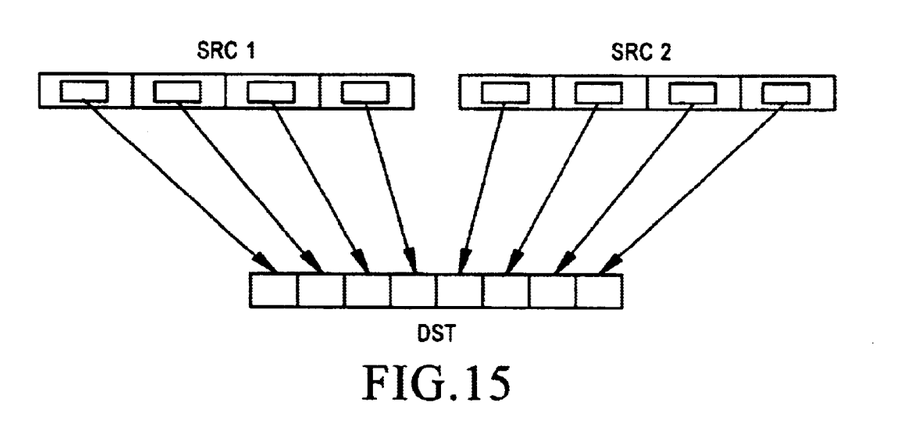
FIG. 15 is a diagram of a partitioned compression operation according to an embodiment of this invention.

As described above, some of the extended partitioned arithmetic instructions receive operands of interleaved data. Such interleaving is provided by the partitioned formatting instructions introduced herein: partitioned interleave; partitioned compress; and partitioned interleave and compress. Partitioned interleave:

To prepare the source operands for either of the type 4 or type 5 extended partitioned arithmetic instructions, a partitioned interleave instruction is used. Referring to FIG. 14, in a partitioned interleave instruction the subwords of two source operand words are interleaved into two destination operand words. Subwords in corresponding locations of the two source operands are placed adjacent to each other in the destination operand word. As a result one-half of the subwords in the source operands are moved into one destination operand, while the other half of the subwords in the source operands are moved into the other destination operand. In a preferred embodiment the interleaving is performed according to precision location rank. Lowest order subword of each source operand is interleaved into the lowest order subwords of the destination operand. Next lowest order subword of each source operand are interleaved into the next lowest order subword of the same destination operand. Such pattern is repeated to fill one destination operand with the lower half of the source operand subwords and the other destination operand with the upper half of the source operand subwords. Partitioned Compress:

The results of the extended partitioned arithmetic instructions typically have a larger partitioned precision than the desired output data format for an algorithm. A partitioned compress instruction reduces the partitioned precision. Referring to FIG. 15, the partitioned precision of each subword is reduced by half for all subwords in each of two source operands. The compressed subwords from one source operand are moved to either an upper or lower half of the destination operand, while the compressed subwords of the other source operand are moved to the other of either the upper or lower half of the destination operand. A source operand subword is compressed by taking the half of the bits in the subword. A shifting and saturation operation can be performed to obtain the desired reduced precision.
Partitioned interleave and compress.

Figure 16:
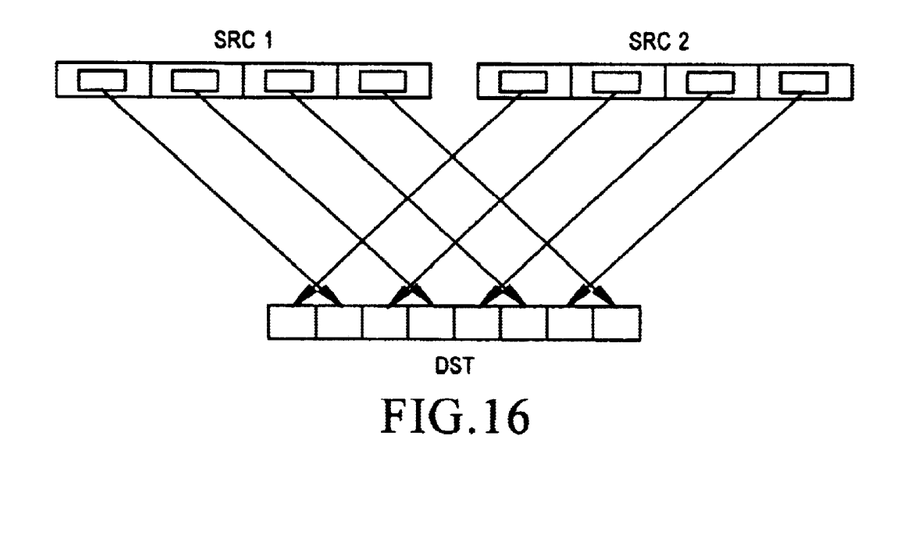
FIG. 16 is a diagram of a partitioned compress and interleave operation according to an embodiment of this invention.

Some of the partitioned sigma instructions, such as the partitioned inner product instruction generate results that have a higher number of valid bits. To arrange the partitioned inner product instruction results in an appropriate order and adjust the precision a partitioned interleave and compress instruction is implemented. Referring to FIG. 16, the partitioned precision of two source operands words is reduced to half in the destination operand. Shifting and saturation operations are performed to scale the results. The interleave and compress instruction is a combination of the interleave instruction and the compress instruction. The subwords of each source operand are compressed to reduce the precision. The location of the compressed subwords from the two source operands differs however from the partitioned compress instruction described above. Rather than packing the compressed subwords of one source operand at an upper part of the destination operand and the compressed subwords of the other source operand at the lower part of the destination operand, the compressed subwords are interleaved. The lowest order compressed subword from each source operand are packed in the lowest order subwords of the destination operand. The next lowest order compressed subword from each source operand are packed in the next lowest order subwords of the destination operand. The other compressed subwords are similarly packed with the highest order subword of each source operand being moved to the highest order subwords of the destination operand.

Meritorious and Advantageous Effects

One advantage of partitioning the sigma instructions is that multiple sub-sigma operations are executed concurrently to effectively use the capacity of the mediaprocessor. An advantage of partitioned arithmetic instructions is that accumulation of precision errors are avoided. In particular accumulated precision errors are truncated. An advantage of the partitioned formatting instructions is that subwords are packed in an effective order for performing other partitioned operations.

Although preferred embodiments of the invention have been illustrated and described, various alternatives, modifications and equivalents may be used. For example, the partitioned sigma concepts are implemented for each type of partitioned sigma instruction with the operation performed at a given stage varying in different embodiments. Therefore, the foregoing description should not be taken as limiting the scope of the inventions which are defined by the appended claims.

What is claimed is:

1. A mediaprocessor formed on an integrated circuit chip, the mediaprocessor comprising:
   a functional processing unit;
   microcode for a partitioned sigma instruction;
   on-chip memory for storing a partitioned sigma instruction to be executed entirely on said functional processing unit, wherein the partitioned sigma instruction operates on a first data operand and a second data operand with a result being stored in a destination operand;
   on-chip data memory for storing the first data operand and the second data operand of the stored partitioned sigma instruction, each one of the first data operand and second data operand having a common bit length, the first data operand being partitioned into a plurality of partitions, each partition of the first data operand comprising a first number of first-data-operand subwords, the second data operand comprising at least one partition which in turn comprises a second number of second data-operand subwords, wherein the first number and the second number are equal, and wherein there are more partitions of the first data operand than of the second data operand, and wherein the destination operand is partitioned into a plurality of partitions, wherein there are a common number of partitions in the first data operand and the destination operand;
   wherein for each one subword of the first number of first-data-operand subwords, an interim result is achieved from a first operation performed between said one subword and a corresponding one subword of the second number of second-data operand subwords, wherein the interim result achieved for each one subword of the first number of first-data-operand-subwords is summed to achieve a final result stored in a corresponding partition of the destination operand.

2. The mediaprocessor of claim 1, in which said functional processing unit is one of a plurality of functional processing units in the mediaprocessor capable of executing the partitioned sigma instruction.

3. The mediaprocessor of claim 1, further comprising a pair of registers for packing data into the first data operand and second data operand, the partitioned sigma instruction including a mode identifying how data is loaded into a first register of the pair of registers, wherein said mode is one of at least four modes comprising:
   a first mode in which a first plurality of data subwords on a long word memory boundary are loaded into the first register;
   a second mode in which a second plurality of data subwords on a long word memory boundary are loaded into a second register of the pair of registers, and the first and second registers are shifted to move one subword out of the first register and to move one subword into the first register from the second register;
   a third mode in which the first and second registers are shifted to move one subword out of the first register and to move one subword into the first register from the second register; and
   a fourth mode in which neither of the first register or the second register are shifted.

4. The mediaprocessor of claim 1, in which the first data operand is a partitioned sigma instruction first data operand and the second data operand is a partitioned sigma instruction second data operand, the mediaprocessor further comprising:
   microcode for implementing a partitioned extended arithmetic operation on two data source operands of a first precision and placing results in two destination operands of a second precision which is twice the first precision, a first destination operand of the two destination operands receiving a lower order portion of an extended arithmetic operation, a second destination operand of the two destination operands receiving a higher order portion of the extended arithmetic operation, wherein each one of the two source data operands comprise a common number of subwords.

5. The mediaprocessor of claim 4, wherein said microcode comprises microcode for a partitioned interleave instruction and microcode for a partitioned extended arithmetic instruction, wherein the partitioned interleave instruction executes upon the two source data operands to generate a pair of intermediary operands which are a hierarchically ordered interleaving of the subwords of the two data source operands;

wherein the partitioned extended arithmetic instruction executes an arithmetic operation on a first one of the pair of intermediary operands to generate the first destination operand, the first destination operand achieved by accumulating pairs of adjacent subwords in said first one of the pair of intermediary operands;

wherein the partitioned extended arithmetic instruction is executed again to implement an arithmetic operation on a second one of the pair of intermediary operands to generate the second destination operand, the second destination operand achieved by accumulating pairs of adjacent subwords in said second one of the pair of intermediary operands.

6. The mediaprocessor of claim 1, in which the first data operand is a partitioned sigma instruction first data operand and the second data operand is a partitioned sigma instruction second data operand, the mediaprocessor further comprising:

microcode for implementing a partitioned extended arithmetic operation on a first data source operand of a first precision and a second data source operand of a second precision which is half the first precision, and placing a result of said partitioned extended arithmetic operation in two destination operands of the first precision, a first destination operand of the two destination operands receiving a lower order portion of the result, a second destination operand of the two destination operands receiving a higher order portion of the result.

7. The mediaprocessor of claim 1, in which the first data operand is a partitioned sigma instruction first data operand and the second data operand is a partitioned sigma instruction second data operand, the mediaprocessor further comprising:

microcode for a partitioned interleave instruction which operates on a first source operand and a second source operand and places results in a destination operand, the first source operand and the second source operand comprising a common plurality of subwords, the destination operand receiving one of either an interleaving of lower order subwords from the first source operand and the second source operand, or an interleaving of higher order subwords from the first source operand and the second source operand.

8. The mediaprocessor of claim 1, in which the first data operand is a partitioned sigma instruction first data operand and the second data operand is a partitioned sigma instruction second data operand, the mediaprocessor further comprising:

microcode for a partitioned compress instruction which operates on a first source operand and a second source operand and places results in the destination operand, the first source operand and the second source operand comprising a common plurality of subwords, each subword of the first source operand and the second source operand being a known common bit length, the destination operand comprising a plurality of subwords at twice the number of subwords as the first source operand, each subword of the destination operand having a bit length which is one-half the bit length of the subwords of the first source operand;

wherein the plurality of subwords among the first source operand are allocated to a first subset of the functional processing unit and the plurality of subwords of the second source operand are allocated to a second mutually exclusive subset of the functional processing unit, in which a first partition of the functional processing unit compresses the plurality of subwords of the first source operand and stores the compressed plurality of subwords in first prescribed subwords of the destination operand, and the second partition of the functional processing unit compresses the subwords of the second source operand and stores the compressed plurality of subwords of the second source operand in second prescribed subwords of the destination operand.

9. The mediaprocessor of claim 8, in which the partitioned compress instruction is a partitioned compress and interleave instruction, wherein the destination operand subwords are ordered from a lowest destination subword order position to a highest destination subword order position, wherein the first source operand subwords are ordered from a lowest first source operand subword order position to a highest first source operand subword order position, wherein the second source operand subwords are ordered from a lowest second source operand subword order position to a highest second source operand subword order position, and wherein the destination operand is a hierarchically ordered interleaving of the processed first source operand subwords and the second source operand subwords.

10. The mediaprocessor of claim 9, wherein said microcode comprises microcode for a partitioned interleave instruction and microcode for a partitioned extended arithmetic instruction, wherein the partitioned interleave instruction executes upon the two source data operands to generate a pair of intermediary operands which are a hierarchically ordered interleaving of the subwords of the two data source operands;

wherein the partitioned extended arithmetic instruction executes an arithmetic operation on a first one of the pair of intermediary operands to generate the first destination operand, the first destination operand achieved by accumulating pairs of adjacent subwords in said first one of the pair of intermediary operands;

wherein the partitioned extended arithmetic instruction is executed again to implement an arithmetic operation on a second one of the pair of intermediary operands to generate the second destination operand, the second destination operand achieved by accumulating pairs of adjacent subwords in said second one of the pair of intermediary operands.

11. A mediaprocessor formed on an integrated circuit chip, the mediaprocessor comprising:

a functional processing unit;

microcode for a partitioned compress instruction which operates on a first source operand and a second source operand and places results in a destination operand, the first source operand and the second source operand comprising a common plurality of subwords, each subword of the first source operand and the second source operand being a known common bit length, the destination operand comprising a plurality of subwords at twice the number of subwords as the first source operand, each subword of the destination operand having a bit length which is one-half the bit length of the subwords of the first source operand;

wherein the plurality of subwords among the first source operand are allocated to a first subset of the functional processing unit and the plurality of subwords of the second source operand are allocated to a second mutually exclusive subset of the functional processing unit, in which a first partition of the functional processing unit compresses the plurality of subwords of the first source operand and stores the compressed plurality of subwords in first prescribed subwords of the destination operand, and the second partition of the functional processing unit compresses the subwords of the second source operand and stores the compressed plurality of subwords of the second source operand in second prescribed subwords of the destination operand.

12. The mediaprocessor of claim 11, in which the partitioned compress instruction is a partitioned compress and interleave instruction, wherein the destination operand subwords are ordered from a lowest destination subword order position to a highest destination subword order position, wherein the first source operand subwords are ordered from a lowest first source operand subword order position to a highest first source operand subword order position, wherein the second source operand subwords are ordered from a lowest second source operand subword order position to a highest second source operand subword order position, and wherein the destination operand is a hierarchically ordered interleaving of the processed first source operand subwords and the second source operand subwords.

* * * * *